United States Patent [19]

Bennett

[11] 3,997,636
[45] Dec. 14, 1976

[54] PRILLING

[75] Inventor: Frank William Bennett, Woodbridge, England

[73] Assignee: Fisons Limited, London, England

[22] Filed: Feb. 13, 1975

[21] Appl. No.: 549,799

[30] Foreign Application Priority Data

Feb. 15, 1974 United Kingdom ............... 6893/74

[52] U.S. Cl. .................................... 264/7; 264/13; 264/14; 264/DIG. 51
[51] Int. Cl.² ............................................ B01J 2/16
[58] Field of Search ............... 264/13, 14, DIG. 51, 264/7

[56] References Cited

UNITED STATES PATENTS

| 3,001,228 | 9/1961 | Nack | 264/DIG. 51 |
| 3,457,336 | 7/1969 | Harris | 264/14 |

*Primary Examiner*—Robert F. White
*Assistant Examiner*—James R. Hall
*Attorney, Agent, or Firm*—Wenderoth, Lind & Ponack

[57] ABSTRACT

When prilling molten materials into a tower containing dust particles suspended or carried in a counter-current gas stream, the amount of dust picked up by the droplets of molten material as they pass down the tower can be reduced by the addition of up to 10% by weight of very fine particles having a primary particle size of less than 1 micrometer to the dust in the tower.

8 Claims, No Drawings

PRILLING

The present invention relates to a prilling process.

It is known to prill molten materials by allowing droplets of the molten material to fall down void towers up which a stream of cooling gas flows. However, such a process requires a very tall tower if the droplets are to be sufficiently solidified to remain intact upon hitting the bottom of the tower. In order to overcome this disadvantage, it has been proposed to cause the molten droplets to fall through a zone in which particles of dust are suspended or carried in an upward flow of gas. Whilst the presence of the dust zone reduces the height of the tower required for the prilling operation, the molten droplets often pick up an excessive covering of dust particles and in some cases the amount of dust cannot be controlled satisfactorily.

We have now found that if the dust in the dust zone contains less than 10% by weight of dust particles having an average primary particle size of less than 1 micrometre, then the amount of coarser dust which is picked up is reduced. Moreover, we have found that the reduction in pick-up is achieved with a wide range of combinations of materials for the very fine and coarser dusts, thus permitting considerable flexibility in operation of the prilling process.

The very fine dust particle sizes quoted herein are the sizes of the primary particles in the dust as measured from an electron micrograph. However, these fine dusts in practice agglomerate to form larger particles which may be as much as 100 micrometres in size. Such agglomerates may be used in the process of the invention, provided that they break up during use. Accordingly, the present invention provides a process for prilling a molten material which process comprise causing droplets of the molten material to fall through a zone containing particles suspended or carried in a gas stream characterised in that said particles comprise coarse particles to which have been added up to 10% by weight thereof of particles having a primary particle size of less than 1 micrometre.

Desirably, the molten droplets are prilled into a conventional prilling tower up which flows a gas stream carrying the particles. The gas is conveniently air, although other gases such as nitrogen or carbon dioxide could be used if desired.

Desirably also the droplets after passing through the suspension of particles (or dust zone) fall into a fluidised bed which acts as a cushion for the partially solidified droplets, thus enabling a yet shorter prilling tower to be used in some cases. The fluidised bed may also serve to cool the droplets, e.g. by the provision of cooling surfaces immersed in the bed.

The particles in the dust zone comprises a mixture of very fine particles of primary particle size less than 1 micrometre, preferably less than 0.5 micrometres and coarser particles. The very fine particles are desirably as fine as feasible, e.g. less than 0.1 micrometres in size. The coarser particles are usually many times the size of the very fine particles and are, for example, in the size range 5–150 micrometres, preferably 10–50 micrometres. In order to optimise the control of the pick-up of the coarser particles, it is desirable that the mixture be substantially free from, e.g. contain less than 1% by weight of, particles having primary particle sizes in the range 1 to 5 micrometres. If necessary commercial grades of the coarser material are screened or otherwise classified to remove the particles therefrom.

The optimum amount of very fine material present in the mixture will vary with the nature of the coarse material, the nature of the material being prilled and the amount of pick-up which is desired. The moisture content of the components of the mixture may also affect the amount of dust picked up. However this is not a consistently predictable effect and must either be determined on a trial and error basis in any given case, or substantially dry materials should be used. The composition of the mixture may therefore be varied over a wide range to suit any given case and the optimum composition may be readily determined by simple trial and error. However, we have found that the use of from 0.1 to 2% e.g. about 1%, by weight of the very fine particles based on the total weight of the mixture usually gives satisfactory results.

The very fine particles and the coarser particles may be the same material or may be different materials. The very fine particles are obtained by any suitable technique and many are commercially available materials. It is preferred that the very fine material be a fume, that is a material whose particles are formed in a gas phase, e.g. by subliming a solid or by a gas phase reaction.

As indicated above the very fine particles have a primary particle size of less than 1 micrometre. However, such fine particles tend to agglomerate spontaneously and the very fine particles for present use will normally be used in a form containing such agglomerates typically up to 20 micrometres in size. Within the prilling tower these agglomerates breakdown to the required fine particles and it will be appreciated that powders whose agglomerates do not break down within the prilling tower to a significant extent are not suitable for present use. We have found that the gas flow required to maintain a fluidised bed of the coarse particles drops when particles of size less than 1 micrometre are incorporated therein and this drop in gas flow rate needed offers a simple and convenient method for testing in practise whether agglomerates are being broken down. Suitable materials from which the very fine and coarse particles may be derived include the material being prilled; dolomite; calcite; limestone; sand; mineral silicates; silica; mica; gypsum; bentonite; feldspar; montmorillonite; attapulgite; kieselguhr; talc; fertilizer materials such as potassium and ammonium salts of phosphoric, sulphuric or nitric acids, potassium chloride and potassium metaphosphate; sulphur; magnesium and aluminium salts or compounds such as the oxides, nitrates or carbonates thereof and hydrates thereof; basic slag; phosphate rock; carbon; cements; clays and synthetic resin materials such as polyalkylenes, polyamides and urea/aldehyde condensation products. One or more suitable materials may be present in the very fine and/or coarser materials. Preferred very fine particles are fumed oxides, e.g. metallic oxides, notably $TiO_2$ or fumed silica; carbon black; pulverised fuel ash; and calcitic salts or minerals, e.g. calcium carbonate or calcium silicate; and preferred coarser particles are talc and/or montmorillonite. If desired, the very fine particles may have been given a surface treatment to reduce agglomeration and/or to render them hydrophobic since we have found that hydrophobic particles give greater reduction in dust pick-up when the process of the invention is applied to the prilling of hydrophilic materials, notably molten fertilizers. Suitable surface coatings include calcium stearate and silicone resins, e.g. dimethylpolysiloxane.

The mixture of very fine and coarser materials into which the molten material is prilled may either be preformed outside the prilling tower using conventional powder mixing techniques in which the very fine particles are added to the coarser particles; or may be formed in situ within the tower, e.g. by feeding two separate streams of particulate material, one very fine the other coarse, to the tower in the desired proportion. As indicated above, the very fine material may exist in the form of agglomerates of larger size which are broken down in the prilling tower to give the very fine particles required.

The material to be prilled may be selected from a wide range of fusible materials. However, the process of the invention is of special use in the prilling of fertilizer materials such as ammonium nitrate; ammonium sulphate nitrate; ammonium phosphate; mixtures of ammonium nitrate with for example mono- or di-ammonium phosphate, potassium chloride or magnesium oxide, with or without other materials; potassium phosphate; potassium nitrate; sodium nitrate; and mixtures of any of these. The process is most particularly suited to the prilling of molten urea and molten mixtures of urea. Other materials which may be prilled by the present process include sulphur and alkali-metal hydroxides. It is usually desired that the molten droplets contain less than 10% by weight initial water content.

In the process of the invention, droplets of the molten material are formed in the normal manner, e.g. by allowing the molten material to flow through a plurality of fine apertures in the base of a prilling head; and the droplets then fall through a zone containing the suspension of coarse and very fine particles in a gas (i.e. a dust zone). It is preferred that the gas flow countercurrent to the falling droplets and that it carries the dust particles along with it. The rate of flow of the gas stream is related to the size of the dust particles and to the weight of dust which the gas stream is to carry; the weight of dust being related in turn to the nature, the temperature and the amount of the molten material falling down the tower. In view of these inter-relations it is not possible to give concise conditions under which the prilling tower should be operated. However, in general; the molten droplets will have an initial temperature just above, e.g. 2°–10° C above, their solidification temperature and will be approximately the same size as that desired for the final product e.g. 1 to 5 mms in diameter; the gas flow rate will be between 0.20 and 1.22, preferably 0.25 to 0.70, metres per second; and the gas stream will carry a total of from 0.00016 to 0.0024 g of coarse and very fine dust particles per cubic cm.

After they have fallen through the dust zone, the molten droplets will be partially solidified and have also picked up some dust particles. These solidified droplets are recovered from the prilling tower by any suitable method and may be given a further cooling and/or drying treatment if desired. The off-gases from the tower may be recycled with further dust being added thereto to maintain the desired loading; or the dust may be separated from the off gases, e.g. in a cyclone, and the dust recycled.

In a particularly preferred form of the process of the invention, a fluidised bed of particles is formed below the dust zone and this bed acts as a soft cushion into which the partially solidified droplets fall and may be cooled further before being removed. By providing this cushion, the height of the prilling tower may be yet further reduced. Also, bu controlling the nature of the molten material, e.g. temperature and water content, and the conditions in the upper dust zone, the hardness of the surface of the droplets may be varied so that, when the droplets enter the fluidised bed, the amount of particles picked up by the droplet during its residence in the bed is also controlled. In order to improve the cooling effect of the bed, cooling heat exchanger surfaces, such as coiled pipes, may be immersed in the bed.

The fluidised bed may be formed from particles of the same material as the upper dust zone, in which case the bed and dust zone are conveniently formed by feeding a single gas stream through a bed of particles of mixed sizes in the base of a prilling tower. Alternatively, the dust zone and the fluidised bed may be formed independently using two separate streams of gas and separate ranges of particle sizes in the solids incorporated into the gas streams. In this case it is possible to use a different material in the fluidised bed than in the dust zone. The invention will be illustrated by the following examples in which all parts and percentages are given by weight unless stated otherwise:

EXAMPLE I

Molten ammonium nitrate at 171° C was prilled down a column 14 cms diameter and 4 metres high. Air containing 0.00024 g/cm³ of fullers' earth (75% montmorillonite and 25% calcite, particle size 5 to 50 micrometres) flowed up the column at a rate of 61 cms per second. A fluidised bed about 0.7 metres thick formed at the base of the column and a dust zone was formed above this. In one case no very fine particles were added to the fullers' earth fed to the column; in three subsequent cases very fine particles were added. The results are shown below:

| Additive | Particle size of additive | Dust picked up by the ammonium nitrate |
|---|---|---|
| None | — | 3.3% w/w |
| 1% mineral silicate filler w/w | & Less than 0.05 micrometers | 2.1% w/w |
| 1% carbon black w/w | 0.3 micrometers | 2.8% w/w |
| 1% precipitated silica w/w | 0.03 micrometers | 1.5% w/w |

EXAMPLES 2 – 5

Ammonium nitrate was prilled at 172°–174° C into a 10 cm diameter prilling column. Air was blown up the tower at a linear flow rate of 0.6 metres per second through a bed of 1.5 kg of particles to form a lower fluidised bed zone and an upper dust zone. The dust loading in the upper zone was approximately 300 g/m³. As the ammonium nitrate droplets fell through the dust zone they picked up dust. The dust coated ammonium nitrate was collected from the base of the tower and the dust loading thereon determined by analysis.

In the initial runs the bed contained montmorillonite of particle size range 20 to 70 micrometres. In subsequent runs part of the montmorillonite was replaced with a very fine dust (100% less than 1 micrometre primary particle size), the mixed dusts shaken in a bag and the mixture (1.5 kgs) used to form the bed in the tower. In all cases the addition of the very fine dust caused the upper dust zone to become thicker indicating that the gas flow rate required to maintain the fluidised bed in its original state had dropped and that agglomerates of the very fine dust were being broken down. The results of these tests are set out below:

| Dust | | % dust picked up w/w on ammonium Nitrate | Example No. |
|---|---|---|---|
| Montmorillonite % w/w | Fine dust % w/w | | |
| 100 | — | 8.37 | — |
| 99.79 | & 0.21 fumed silica | 2.10 | 2 |
| 99.33 | 0.67 precipitated silica | 6.30 | 3 |
| 99.67 | 0.33 TiO$_2$ | 6.37 | 4 |
| 98.0 | 2.0% precipitated calcium silicate | 7.55 | 5 |

EXAMPLE 6

The process of example 2 was repeated using fumed silica (primary particle size 0.01 to 0.03 micrometres) which had been given a surface treatment to render it hydrophobic. The results of these tests are set out below.

| % silica in dust | % dust picked up |
|---|---|
| — | 10.1 |
| 0.66 | 1.0 |
| 0.33 | 4.0 |
| 0.13 | 6.4 |

EXAMPLE 7

The process of Example 2 was repeated using calcitic calcium carbonate (mean primary particle size 0.075 micrometres) coated with approximately 2.5% of calcium stearate. The results are set out below:

| % calcium carbonate in dust | % dust picked up |
|---|---|
| — | 6.2 |
| 1% | 4.3 |

EXAMPLE 8

The process of Example 2 was repeated using amorphous silica having a primary particle size of less than 1 micrometre. The results are set out below:

| % silica in dust | % dust picked up |
|---|---|
| — | 10.8 |
| 5 | 7.4 |

What I claim is:

1. In a process of prilling molten material in a cooling tower, comprising:

A. directing falling droplets of a molten material into a cooling tower containing a zone formed by an upward flow of a gas carrying suspended solid particles therein to cool and solidify the droplets and B. collecting the solidified droplets at the bottom of the cooling tower;

the improvement wherein

C. said zone contains a mixture of coarse particles of a primary particle size of 5 to 150 micrometers and 0.1 to 10.0% by weight, based on the weight of the coarse particles, of fine particles having a primary particle size of less than 1 micrometer, said fine particles being made of a material different than that of the coarse particles, said fine particles functioning in the mixture by reducing the amount of coarse particles picked up by the molten material.

2. A process according to claim 1, wherein the molten material is hydrophilic and the fine particles are hydrophobic.

3. A process according to claim 1, wherein the fine particles are selected from solid particles having been previously sublimed and solid particles obtained by a gas phase reaction.

4. A process according to claim 1, wherein said zone containing the mixture of particles comprises a lower fluidized bed zone and an upper dust zone.

5. A process according to claim 1, wherein the fine particles are formed in situ within the cooling tower by introducing into said zone agglomerates of said fine particles which break down within said tower to said fine particle size of less than 1 micrometer.

6. A process according to claim 1, wherein the coarse particles are selected from the group consisting of clays, talc, fuller's earth, montmorillonite and calcite.

7. A process according to claim 1, wherein the fine particles are selected from the group consisting of fumed silica, metallic oxides, calcium carbonate, calcium silicate and pulverized fuel ash.

8. A process according to claim 1, wherein the molten material is a fertilizer; the coarse particles are selected from the group consisting of clays, talc, fuller's earth, montmorillonite and calcite, and wherein the fine particles are selected from the group consisting of fumed silica, metallic oxides, calcium carbonate, calcium silicate and pulverized fuel ash, said fine particles being present in an amount of 0.1 to 5% by weight of the coarse particles.

* * * * *